United States Patent Office 2,818,175
Patented Dec. 31, 1957

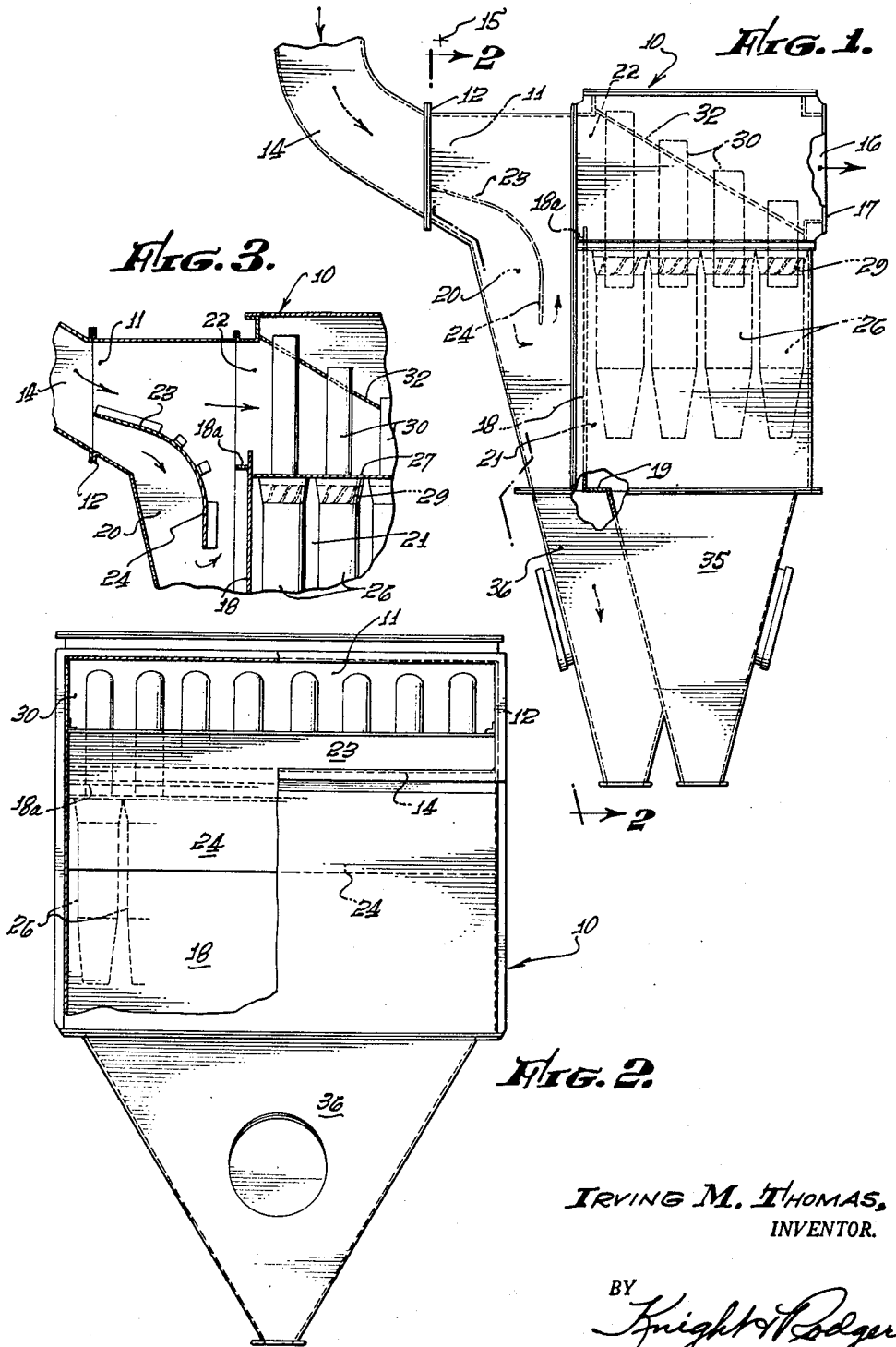

2,818,175
DUST COLLECTOR CONSTRUCTION

Irving M. Thomas, Los Angeles, Calif., assignor to Western Precipitation Corporation, Los Angeles, Calif., a corporation of California Application July 30, 1956, Serial No. 601,072

4 Claims. (Cl. 209—143)

The present invention relates generally to dust collectors which collect particles suspended in a stream of gas; and more especially to apparatus of this type in which the collection is carried out in two separate stages in order to effect a rough classifying action by collecting separately coarse and fine fractions of the suspended particles.

In many cases, the materials suspended in a gas stream cover a very wide range of sizes. Coarse particles may be relatively easy to collect because they settle quickly and easily. On the other hand the fine particles may include such small size as to be difficult to separate from the gas.

Carrying out the separating action in two stages or at two different locations sometimes produces one or more advantages when the suspended particles are of wide range of sizes. In some instances the coarse fraction of collected particles may be capable of a separate use apart from whatever disposition is made of the fine fraction of particles. It will be easily understood that separating out the coarse materials as soon as possible reduces the amount of wear upon the equipment required to collect the finer particles. It is also true that in some instances by effecting a preliminary separation, the later separation of the finer particles can be carried out with a higher degree of efficiency.

Hence it becomes a general object of my invention to design a classifying collector of this general character which enables a preliminary separation of coarse particles to be carried out followed by collection of the finer particles and which is simple in construction and efficient in operation.

A dust collector constructed according to my invention is characterized by a housing provided with a gas inlet and a gas outlet and interior partitions or wall means which subdivide the interior of the housing into a first and a second separating chamber. The wall means provide a vertical wall at the back of the first chamber which separates it from the second chamber; and near the top of the vertical wall means is a fin which projects horizontally, or substantially so, into the first chamber. In the first chamber there is located baffle means consisting of a divider plate which divides the incoming gas stream into upper and lower sections and a diversion plate which deflects the lower gas stream downwardly. When the gas stream turns upwardly around the lower end of the diversion plate, the coarse material separates out of the gas stream. The gas stream then rises and flows into the second chamber where the separation of the fine particles takes place. For this purpose, the second chamber contains a plurality of centrifugal dust collecting units which may be of any well-known design. Beneath each of the separating chambers is hopper means so that the coarse particles and the fine particles are collected separately in different hoppers.

The separation of the coarse particles is more effective if the dust collector is used in conjunction with a gas conduit which is curved in a vertical plane for a portion of the conduit immediately adjacent the connection of the conduit to the gas inlet of the housing. The curvature is in such a direction that the gas moves downwardly and then to one side to enter the housing and as it makes the turn, the coarse particles are thrown to the lower outside wall of the housing, thus concentrating the coarser particles in that portion of the gas stream which passes underneath the divider plate.

How the above objects and advantages of my invention, as well as others not specifically mentioned herein, are attained, will be more readily understood by reference to the following description and to the annexed drawing, in which:

Fig. 1 is a side elevation of a dust collector constructed according to my invention with a gas supply conduit connected to the inlet of the housing;

Fig. 2 is a combined side elevation and vertical section as indicated by the line 2—2 in Fig. 1; and Fig. 3 is a fragmentary vertical section through an upper portion of the two separating chambers of the dust collectors.

The housing of the dust collector is indicated generally at 10. It is provided at one side with an opening 11 which serves as a gas inlet and is surrounded by a flange 12 to which is attached gas supply duct 14. Duct 14 brings a stream of gas with materials suspended therein to the dust collector from any source, not shown in the drawings. As may be seen particularly in Fig. 1, conduit 14 is so shaped that the gas stream is moving downwardly as well as horizontally at the time that it enters inlet 11, the conduit adjacent the inlet being curved in a vertical plane in such a direction that the center of curvature 15 is above inlet 11. As a consequence, the gas is directed through an arcuate path immediately prior to entering the dust collector.

On the opposite side of housing 10, the housing is provided with another opening 16 which serves as a gas outlet. This opening is preferably surrounded by a flange 17 to which may be attached an exhaust duct, if desired, or it may discharge cleaned gas directly to the atmosphere, as shown.

The space inside the housing is divided generally into two different separating chambers 20 and 21 by suitable wall means. Such wall means includes vertical wall 18 which extends entirely across the housing and is connected to the side walls of the housing. The vertical wall 18 is connected at its lower end to a short length of horizontal wall 19 which likewise extends between the two side walls of the housing. Wall 18 is spaced at its upper end from the top wall of the housing in order to form an opening 22 that provides communication between the two chambers at either side of the wall. At or near the top edge of wall 18 is a fin 18a that projects horizontally, or substantially so, for a short distance toward inlet 11 from the face of wall 18.

The first separating chamber 20 is at the left hand side of wall 18 when the apparatus is viewed as in Fig. 1 and is in free communication with gas inlet 11. The second chamber 21 occupies space within the housing to the right of wall 18, when the apparatus is viewed as in Fig. 1, and is in communication with gas outlet 16.

Within the first chamber, there is located baffle means which consists of two sections 23 and 24. Initial section 23 is a flat plate that acts as a divider to divide the gas stream entering through inlet 11 into an upper and a lower stream which flow respectively above and below the baffle means. For this purpose divider plate 23 extends to or near inlet 11, although the exact point at which the plate terminates with respect to the inlet is not critical. As will be mentioned later, the two gas streams are not ordinarily equal in size, the lower gas stream being preferably considerably smaller than the upper one;

and consequently the leading edge of divider plate 23 is located in the vicinity of the lower third point of inlet 11.

The second section 24 of the baffle means is a plate that acts as a deflector. It is preferable that this deflector section include a curved transition portion followed by a flat portion as shown. The deflector section is preferably integral with or in engagement with the inner end of plate 23, although the invention is not necessarily so limited. Deflector plate 24 is disposed below and in general at an angle relative to divider plate 23 to be interposed in the path of the lower gas stream flowing below plate 23. Plate 24 is preferably vertical, or substantially so, in order to deflect this lower portion of the main gas stream vertically down within chamber 20. As may be clearly seen in Figs. 1 and 3, plate 24 is spaced from wall 18 in order that there is room between them for the gas stream to reverse its direction of flow and rise upwardly to flow into the second chamber 21.

The centrifugal type of dust separating means contained in second chamber 21 may be of any suitable type; and since such means are well known in the art, they will not be described here in detail. A preferable dust collecting means includes a plurality of cylindrical separating tubes 26 supported from a horizontally extending tube sheet 27 and each is provided at its upper end with suitable means for imparting a spinning motion to the gas stream as it enters the tube. As typical of such means, there is illustrated in Figs. 1 and 3 inclined vanes 29 which produce the desired spinning motion of the gas stream in order to effect separation of suspended particles by centrifugal action.

The cleaned gas leaves each separating tube 26 through an outlet tube 30 which is located concentrically of the separating tube and extends upwardly above the upper end of the separating tube to pass through slanting tube sheet 32. The space above tube sheet 27 but below and to the left of tube sheet 32 is a common inlet chamber for all of the separating tubes. Gas enters this inlet chamber through opening 22. The space above and to the right of tube sheet 32 is an outlet chamber which receives the cleaned gas discharged by outlet tubes 30. The cleaned gas leaves the housing by way of gas outlet 16.

Beneath housing 10 are two hoppers 35 and 36. Hopper 35 is located below separating tubes 26, the lower ends of which are open and communicate directly with the space in housing 10 directly above hopper 35. The sides of hopper 35 taper downwardly to a connection to a suitable type of dust discharge valve, not shown in the drawing, through which dust collected in the hopper can be periodically removed from the hopper. A second hopper 36 is provided which communicates at its upper end with first separating space 20 so that dust separated from the gas stream within the first chamber can fall by gravity into the hopper where it collects. The walls of this hopper are likewise inclined so that the hopper tapers downwardly to be connected to another dust discharge valve, not shown in the drawing, through which dust can be periodically removed to empty the hopper. For reasons of economy, the two hoppers have a common side wall for a major portion of their vertical extent.

Horizontal wall 19 fills in any gap between vertical wall 18 and the nearest side wall of hopper 35, in this case the common wall between the two hoppers. This is done in order to isolate the interior of hopper 36 and chamber 20 from the separating chamber 21. Accordingly, the horizontal dimension of wall 19 in the plane of Fig. 1 is determined by the relative locations of wall 18 and the hopper wall. It will be seen that if these two walls meet each other, the horizontal wall 19 may be omitted.

While the operation of a dust collector constructed as described above will be largely self-evident, its operation will now be described briefly. The main gas stream entering the dust collector through supply duct 14 is moving generally horizontally as it passes through inlet 11 but is preferably directed at a small angle below the horizontal as a consequence of the vertical curvature imposed upon its flow path by the shape of duct 14. This curvature around center 15 is in a direction to cause the larger particles of material to be thrown against the lower wall of duct 14, since this lower wall is at the outside of the curve followed by the gas stream. The force of gravity is added to the centrifugal force imposed upon suspended particles during the change in direction of the gas stream and as a result the heavier or coarser particles are concentrated in the portion of the gas stream closest to the lower outside wall of the supply duct.

The purpose of divider plate 23 is to separate this portion of the gas stream in which the heavier particles are now concentrated from the remainder of the gas stream which contains the finer particles. The relative size of the two gas streams is in no way critical and is determined by conditions existing in any given installation, but is here shown as being the ratio of approximately 2:1, the upper stream above plate 23 being the larger. The lower gas stream moving beneath divider plate 23 carries the coarse particles which is desired to separate from the gas stream in the first chamber 20. This separation is effected by causing the gas to make an abrupt change of direction through an angle of 180°, or as close thereto as possible. For this purpose divider plate 23 is followed by deflector 24 which causes the lower gas stream to be deflected directly downwardly. After passing deflector plate 24, the gas stream reverses its direction and moves upwardly on the other side of the deflector between it and vertical wall 18. Here the change in direction of flow in a vertical plane causes the centrifugal force imposed upon the suspended particles to move out of the gas stream and downwardly within the chamber; and this force is added to the force of gravity which is at all times acting on the suspended particles in a direction to cause them to settle out of the gas stream.

As a result of this movement of the gas stream, the coarser particles are separated from the gas stream moving through chamber 20 and drop into the lower portion of the separating chamber, from whence they fall by gravity into collecting hopper 36. The finer particles which are retained in suspension are carried by the gas stream through opening 22 into the second separating chamber 21.

Plate 24 is directly in the path of the lower gas stream flowing beneath plate 23 and for this purpose is preferably made removable since it is subjected to a considerable amount of erosion as a result of the suspended particles striking against the plate and must be replaced from time to time.

Divider plate 23 is preferably positioned to be generally parallel to the direction of the gas stream as it enters the dust collector through gas inlet 11. Accordingly, if the gas stream enters moving in a horizontal direction, divider plate 23 is disposed horizontally. Plates 23 and 24 together constitute baffle means which divides the gas stream entering through inlet 11 into two portions and deflects the lower portion downwardly within the first separating chamber where the first stage of separation takes place as the gas stream reverses its direction and moves upwardly around the lower end of plate 24.

It will be realized that in the original gas stream there is no sharp dividing line between coarse and fine particles, rather particles are present of all sizes. This fact, along with the fact that the entire gas stream is in the bend of duct 14 for only a short time, results in less than a complete concentration of all particles over a certain size in the portion of the gas stream flowing below plate 23. This lower portion of the gas stream also carries its proportion of fine particles. It should be understood that the gas velocity may not be uniform throughout the lower portion of the gas stream as it moves through the first separating chamber. Because of the change in direction of flow around plate 24, the gas tends to be moving at a higher velocity close to the face of plate 18 than in other portions of the stream. As a result there is a tendency for some particles which are very close to the dividing point between those separated in the first chamber and those carried over, to be re-entrained in the gas stream by the higher velocity adjacent the face of plate 18. Ordinarily these particles would mostly move upwardly along or close to the face of plate 18 and be carried into the second separating chamber. However, it has been found that a sharper classifying action can be obtained and these border line particles held back in the first separating chamber by placing a horizontal fin in the form of strip 18a at some position near the upper edge of wall 18. This fin 18a forms a barrier to movement of these border line particles and causes them eventually to fall back into the lower portion of the first separating chamber.

All the gas flowing through opening 22 into the second separating chamber 21 flows through one of separating tubes 26 wherein the fine or second stage of particle separation from the gas stream is effected by centrifugal action, as is well understood in the art and does not need to be described in detail here. The separating action in tubes 26 is carried out with a relatively high efficiency and the cleaned gas leaves each separating tube through an outlet tube 30. The fine particles separated in this second stage drop out of the open lower end of each separating tube 26 and fall by gravity into hopper 35 where they are collected.

From the foregoing description it will be understood that various changes in the exact arrangement and disposition of the parts constituting the dust collector of my invention, may occur to those skilled in the art without departing from the spirit and scope of my invention. Consequently, it is to be understood that the foregoing description is considered as being illustrative of, rather than limitative upon, the invention as set out in the appended claims.

I claim:

1. A classifying dust collector comprising: a housing having a gas inlet and a gas outlet and having interior wall means dividing the interior space of the housing into a first and a second chamber communicating with each other, the gas inlet being near the top of the first chamber; an angular baffle located in the first chamber at the gas inlet, said baffle having a first portion dividing the incoming gas stream into an upper and a lower stream, and a second portion extending downwardly from the first portion to deflect downwardly the lower gas stream, said second portion being spaced from other wall means to permit the deflected gas stream to pass around the baffle and enter the second chamber; and a plurality of centrifugal type separating units in the second chamber receiving gas from the combined gas streams.

2. A classifying dust collector comprising: a housing having a gas inlet and a gas outlet; wall means inside the housing, including a vertically extending wall, forming a first and a second separating chamber communicating respectively with said gas inlet and said gas outlet and communicating with each other through an opening at the top of said vertical wall; a divider plate in the first chamber at the gas inlet dividing the incoming gas into an upper and a lower stream and directing the upper stream to said opening; a deflection plate extending downwardly in the path of the lower stream deflecting the lower stream downwardly and then directing the stream upwardly around the deflection plate to reach said opening; and a plurality of centrifugal type separating units in the second chamber receiving the combined upper and lower gas streams.

3. A classifying dust collector as in claim 2 that also includes a horizontally disposed fin near the top of the vertical wall means projecting into the first chamber.

4. Classifying dust collecting apparatus that comprises: a housing having a gas inlet and a gas outlet; wall means inside the housing, including a vertically extending wall, forming a first and a second separating chamber communicating respectively with said gas inlet and said gas outlet and communicating with each other through an opening at the top of said vertical wall; a divider plate in the first chamber at the gas inlet dividing the incoming gas into an upper and a lower stream and directing the upper stream to said opening; a deflection plate extending downwardly in the path of the lower stream deflecting the lower stream downwardly and then directing the stream upwardly around the deflection plate to reach said opening; a plurality of centrifugal type separating units in the second chamber receiving the combined upper and lower gas streams; and a gas conduit connected to the gas inlet of the housing and curved in a vertical plane adjacent the housing, the center of curvature being above the inlet to the housing.

References Cited in the file of this patent

UNITED STATES PATENTS

| | | |
|---|---|---|
| 2,553,175 | Davenport | May 15, 1951 |
| 2,773,598 | Castellani | Dec. 11, 1956 |